Patented May 9, 1944

2,348,609

UNITED STATES PATENT OFFICE 2,348,609

PROCESS FOR PRODUCING WHITE OILS

Charles A. Cohen, Elizabeth, N. J., assignor to Standard Oil Development Company, a corporation of Delaware No Drawing. Application December 26, 1940, Serial No. 371,778

6 Claims. (Cl. 196—40)

This invention relates to an improved process for refining petroleum hydrocarbons. More particularly, it is concerned with the treatment of oils of the white oil type, such as medicinal oils, transformer oils, insecticide base oils, refrigerator oils, cosmetic oils, or lubricating oils, such as spindle oil and motor oil, or highly refined petroleum waxes which have during the process of their refinement been subjected to the action of strong sulfuric acid or fuming sulfuric acid. The point of application of this invention is in that part of the process when the oils or waxes have been treated with strong sulfuric acid or fuming sulfuric acid and the resulting sludge has been removed by settling and decantation. At this stage, the oil reacts strongly acid due to dissolved sulfur dioxide and oil-soluble sulfonic acids known as "mahogany acids," and is black in color and nearly opaque due to suspended and colloidally dispersed globules or particles of water-soluble sulfonic acids known as "green" or "black acids," sludge and tar. The latter group of acids, sludge and tar which remain suspended in the acid oil after the major portion of the sludge has separated out by settling is known collectively as "pepper sludge."

One of the principal objects of the present invention is to so treat the substantially desludged oil that the remaining pepper sludge is completely removed.

Heretofore highly acid-treated oils or white oils have been prepared by the drastic treatment of a hydrocarbon oil having a viscosity in the range of 30 to 1000 seconds Saybolt at 100° F. with fuming sulfuric acid, followed by separation of the acid sludge from the oil, neutralization of the acid oil with an alkali, substantial removal of the oil-soluble sulfonic acid salts or "mahogany soaps" from the oil by water-washing or by dilute alcohol or other solvent and steaming of the oil to remove the solvent or other volatile constituents. The oil at this stage is known as a neutral oil and may vary in color from about a —10 to +20 Saybolt. The colored material may be hydrocarbon in nature where the conditions or amount of acid treatment used was mild, or may be due to small amounts of organic sulfonic acid salts or products of their degradation which are difficult to remove by washing. The neutral oil is then finished by contacting with adsorbent clay fines or adsorbent carbon, or bauxite or the like, or by percolation through a bed of adsorbent clay or carbon or bauxite or the like to give a water-white finished oil of a +30 up Saybolt color.

Substantially the same methods are used in the refining of petroleum waxes with the exception that higher temperatures are used in order to keep the wax in a fluid condition.

According to the present invention, it has been found that if substances, such as the various diatomaceous filter aids, tripoli, finely ground silica, such as "Snow floss" and "Super floss," finely ground carborundum or Attapulgus fines, and activated carbon, are added to the acid-reacting oil after the acid sludge has been substantially removed, the oil agitated and then filtered, the oil leaving the filter is completely free of pepper sludge, with a +30 up Saybolt color and still contains the oil-soluble sulfonic acids or mahgony acids originally present in the acid oil.

In treating oils with strong sulphuric acid or fuming sulfuric acid, it has been common plant practice in the past to use large settling tanks in order to separate the sludge from the oil. With the lighter viscosity oils a settling time of from 5 to 10 hours has usually sufficed but with the heavier viscosity oils, periods up to 20 hours of settling must be employed. As is commonly known, on treating oils with fuming sulfuric acid, there is a destruction of the more unstable portion of the oil with the formation of a number of by-products. A group of oil-soluble sulfonic acids remaining in the oil, commonly known as "mahogany acids," and a group of water-soluble sulfonic acids remaining in the sludge and commonly known as "green" or "black acids," are the principal by-products formed during the sulfonation. The mahogany acids, when pure, are very light in color, varying from a water-white to a pale yellow; the green or black acids, on the other hand, have a very high tinctorial power and if permitted to remain in the oil at the time it is neutralized with alkali, will give rise to degradation products which increases the color of the oil making the load on the percolation filters later used in the purification of the oil greater than if they could be absent from the oil. Ordinary settling of oil and sludge as usually done permit about 1% of pepper sludge to remain in the oil and the pepper sludge when neutralized with alkali gives the neutral oil the yellow color which ordinarily distinguishes it from the finished oil. Attempts have been made to separate the sludge in a more efficient manner than can be accomplished merely by settling, and centrifuges have been employed to this end. Aside from the expense of their installation and operation, they suffer from many disadvantages.

Their major disadvantage is inherent in the design of the centrifuge itself. For example, if it is desired to secure the maximum yield of clarified oil, some sludge must be permitted to accompany the oil in coming through the oil overflow. On the other hand, if it is desired to secure the maximum separation of sludge, then some oil must be permitted to accompany the sludge thus making the centrifuge a time saver, but inefficient in comparison with the present invention. Commercial centrifuge installations, which are operated to obtain the maximum oil yield, usually deliver the oil with an amount of sludge that is equal to from $\frac{1}{10}$% up to 1%. Even with as little as one-tenth of 1% of suspended sludge in the oil, the tinctorial power of the sludge or the degradation products thereof on subsequent neutralization is so great that it succeeds in highly coloring both the oil and the mahogany soap extracted from the oil. In addition to coloring the oil which, to a certain extent, can be corrected by taking a smaller yield on a percolation filter, the presence of the pepper sludge in the oil at the time of neutralization tends to aggravate the tendency of the oil to become corrosive to copper and to fail to pass light stability tests.

In practicing this invention, the types of substances added to the oil are preferably materials such as tripoli, which is disintegrated volcanic rock, various diatomaceous earths, finely ground silica, such as the materials commercially known as "Snow floss" and "Super floss," and activated carbon. The diatomaceous earth may be chosen from the following classification: air dried and ground natural earth, calcined and ground earths, earth fused with caustic and ground and the acid-treated and calcined ground earths. Diatomaceous earth and prepared diatomaceous earth of these types are commercially available and are known as J-M filter aids and "Dicalites." Activated carbon may be either the natural or acid-treated variety. The tripoli or the filter aid is added to the oil in an amount equal to from 1 lb. to 50 lbs. per thousand gallons of acid oil to be treated. The rapidity with which the pepper sludge precipitates after the addition of the filter aid to the acid oil has led the inventor to believe that the phenomenon is due to the mutual coprecipitation of oppositely charged colloidal particles.

The method of treating the oil with the diatomaceous earth, tripoli or silica may be varied from either the direct addition of these materials to the oil in the form of a dry powder or the materials may be previously admixed with a portion of the oil to form a slurry which can be pumped into the main body of the oil. The oil, after the addition of the filter aid, may be agitated for a period of from 5 minutes to ½ hour and then filtered through a plate and frame press, a continuous rotary press, or may be centrifuged out by means of a basket type of centrifuge. In using the plate and frame or rotary type of press, it is advantageous to precoat the press with from 5 to 10 lbs. of the diatomaceous filter aid per hundred square feet of filter press area. Another, and the preferred, means for removing the filter aid from the oil is by means of a series of settling tanks. The oil as it leaves the agitator is pumped into a settling tank at a rate sufficient to give it a settling time of from 5 minutes to 1 hour, depending on the viscosity of the oil being treated, and according to the amount of filter aid which was used in treating the oil. Within certain limits, the smaller the amount of filter aid which has been used the more rapidly does one obtain settling of the filter aid-pepper sludge complex. This is probably due to the fact that as the amount of filter aid used is decreased, the resultant density of the filter aid-pepper sludge complex is increased. One or more settlers may be used if desired and the oil may be given a final clean-up after it leaves the settler with or without the addition of filter aid by filter pressing through a plate and frame press or continuous rotary press which has been previously precoated with the same filter aid. The oil leaving the press at this stage contains dissolved in it some sulfur dioxide and, in addition, all of the mahogany sulfonates originally present in the acid oil. The dissolved sulfur dioxide at this stage may be removed by air-blowing without deleterious effect and this may be most conveniently accomplished by passing the oil downwardly through a packed column while blowing countercurrently with a stream of air or inert gas. Another method of accomplishing this desired end may be by passing the oil downward through a packed column or in the form of a thin film while maintaining a vacuum on the system. The oil leaving the final filter press is perfectly clear and of a +30 Saybolt color.

In treating the oil with the acid, the temperature employed may vary from below room temperature to as high as 100° C. depending upon the nature of the distillates being treated and the severity of the acid treat. During the settling of sludge which occurs in the sludge separator, there is usually a drop in temperature although in the case of acid treatment of waxes, it is desirable to artificially supply some heat in order to keep the mixture in a fluid state. The oil leaving the sludge separator will therefore vary in temperature from substantially room temperature to 100° C. and the filter aid may be added to the oil either with or without cooling, although it is preferred to operate at a temperature of substantially room temperature in the case of oil at which there is no noticeable decomposition of the entrained pepper sludge, and in the case of waxes, at a sufficiently high temperature to keep it in a fluid condition.

The invention will be more clearly illustrated by the following example:

*Example 1*

1000 gallons of a petroleum distillate which had a viscosity of about 55 seconds Saybolt at 100° F. was treated with 40% by volume of 20% fuming sulfuric acid in a number of dumps allowing a period of one hour for separation of the sludge between each dump. After the final dump had settled one hour, the oil layer was decanted from the lower sludge layer and 500 gallons of this acid oil was treated with 5 lbs. of a commercial diatomaceous filter aid known as J-M No. 545 Celite. The oil-Celite mixture was vigorously agitated for a period of 5 minutes, allowed to settle for 15 minutes, and the clear supernatent oil filtered through a filter press which had been precoated with the same filter aid to the extent of 5 lbs. of filter aid for every 100 sq. ft. of filter area used. The filtered oil which was perfectly clear and entirely colorless was then treated in a vacuum stripper until substantially free of sulfur dioxide and then neutralized and washed with 50% by volume of 50% isopropyl alcohol. The alcohol solution of the mahogany soap was separated, and the oil steamed until free of solvent. The resulting neutral oil had a +30 up Saybolt color, was perfectly water-white, and was entirely suitable for use as a finished oil for many technical purposes without the necessity of clay percolation. For comparative purposes, the remainder of the 1000 gallons of acid-treated oil were finished in the usual manner without the addition of the No. 545 Celite. The neutral oil finished from the untreated acid oil had a color of +19 Saybolt. A 10% by weight solution in water-white oil of the mahogany soap isolated from the alcohol wash liquors of the two oils gave the following color in a 1" cell in a Lovibond Tintometer. The treated oil gave 1.1 yellow, 0.2 red. The untreated oil gave a soap color of 23 yellow and 3.6 red. The two oils when percolated through Attapulgus clay showed that the treated oil gave a higher yield of taste pass finished oil than the untreated oil, and also that the treated oil was freer from material corrosive to copper and showed a better stability to light.

What is claimed is:

1. The process of removing pepper sludge from a petroleum hydrocarbon having a viscosity in the range of 30 to 1000 seconds Saybolt at 100° F. treated with 40% by volume of 20% fuming sulfuric acid, while still in an acid reacting condition, which comprises agitating the hydrocarbon with a finely divided substance selected from the group consisting of filter aids of diatomaceous origin, and finely ground silica, at a temperature between room temperature and 100° C. and removing the finely divided substance-pepper sludge complex.

2. The process of removing pepper sludge from a petroleum hydrocarbon having a viscosity in the range of 30 to 1000 seconds Saybolt at 100° F. treated with 40% by volume of 20% fuming sulfuric acid, while still in an acid-reacting condition, which comprises agitating the hydrocarbon with from 1 to 40 lbs. per thousand gallons of oil of a finely divided substance selected from the group consisting of filter aids of diatomaceous origin and finely ground silica, at a temperature between room temperature and 100° C. and removing the finely divided substance-pepper sludge complex.

3. The process of removing pepper sludge from a petroleum hydrocarbon having a viscosity in the range of 30 to 1000 seconds Saybolt at 100° F. treated with 40% by volume of 20% fuming sulfuric acid, while still in an acid-reacting condition, which comprises agitating the petroleum hydrocarbon with 10 lbs. of a finely divided substance selected from the group consisting of filter aids of diatomaceous origin and finely ground silica, per thousand gallons of hydrocarbon at a temperature between room temperature and 100° C. and removing the finely divided substance-pepper sludge complex.

4. The process of removing pepper-sludge from a petroleum hydrocarbon having a viscosity in the range of 30 to 1000 seconds Saybolt at 100° F. treated with 40% by volume of 20% fuming sulfuric acid, while still in an acid-reacting condition, which comprises agitating the hydrocarbon with 10 lbs. of finely divided tripoli per thousand gallons of hydrocarbon at a temperature of 50° C. and removing the finely divided tripoli-pepper sludge complex.

5. The process of removing pepper sludge from an oil having a viscosity of about 55 seconds Saybolt at 100° F. before treatment with 40% by volume of 20% fuming sulfuric acid, while still in an acid-reacting condition, which comprises agitating the oil with 10 lbs. of finely divided tripoli per thousand gallons of oil at a temperature of 50° C. and removing the finely divided tripoli-pepper sludge complex.

6. In a process for removing pepper sludge from an oil having a viscosity of about 55 seconds Saybolt at 100° F. before treatment with 40% by volume of 20% fuming sulfuric acid, the step which comprises adding finely divided tripoli, agitating and removing the finely divided siliceous substance-pepper sludge complex by settling and decantation.

CHARLES A. COHEN.